March 12, 1963  M. E. JARRELL  3,081,053

LOCKING AND UNLOCKING MECHANISM

Filed April 14, 1960

Inventor
MARTIN E. JARRELL

By R. J. Tompkins

Attorney

United States Patent Office 3,081,053
Patented Mar. 12, 1963

3,081,053
LOCKING AND UNLOCKING MECHANISM
Martin E. Jarrell, Arlington, Tex., assignor, by mesne assignments, to the United States of America as represented by the Secretary of the Navy
Filed Apr. 14, 1960, Ser. No. 22,377
3 Claims. (Cl. 244—49)

The present invention overcomes the above-noted defi- and unlocking mechanism and more particularly to a wing fold locking and unlocking mechanism which requires a minimum amount of travel of the locking pins to obtain locking and unlocking of the wing.

Prior to this time, it has been common practice in the art to provide a foldable wing with a means of locking and unlocking it so as to allow the wing to be rotated into its stowed position when not in use. When the wing was in its extended position, bar means were provided for locking the wing in its extended position. Prior art methods of locking the wing in its extended position usually consisted of some form of a long steel rod which was actuated by a hydraulic cylinder and thus prevented relative rotation between the outer wing panel and the inner wing panel. The main disadvantage of this type mechanism is that if a rod, the length of the hinge, was employed, it would require a similarly long travel of the actuating hydraulic cylinder, thus necessitating a longer period of time to bring the rod into its locking and unlocking positions.

An alternative way of locking the wing in its extended position was to use two hydraulic cylinders, one located at each end of the fold or hinge portion, and each of these two hydraulic cylinders would actuate a rod which was moved into its locking and unlocking position. The main disadvantage of this arrangement was that the full length of the hinge joint was not supported by the locking member so as to transfer and distribute a continuous spanwise bending moment across the wing fold joint.

The present invention overcomes the above-noted deficiencies in the prior art by using a novel type locking mechanism. The complete joint consists of an upper joint and a lower joint. The upper joint is provided with a conventional piano-type hinge, the lower joint is provided with interlacing lugs or knuckles, the knuckles alternately extending from the inner and outer wing panels, respectively. In the present invention, two hydraulic cylinders are provided, one at each end of the hinge joint, for actuating the locking pins into their locking and unlocking position, depending on which cylinder is actuated.

An object of the present invention is the provision of a novel means for locking and unlocking the wing of an aircraft which requires a minimum amount of time.

A further object of the present invention is the provision of a mechanism for transferring a continuous spanwise bending moment across a wing fold joint of an aircraft.

A further object of the present invention is the provision of a novel type of hinge joint locking mechanism.

Still another object of the present invention is to provide a hinge joint which is capable of withstanding greater stresses than prior known joints.

Other objects and many of the attendant advantages of this invention will be readily appreciated as the same becomes better understood by reference to the following detailed description when considered in connection with the accompanying drawings wherein.

Figure 1:
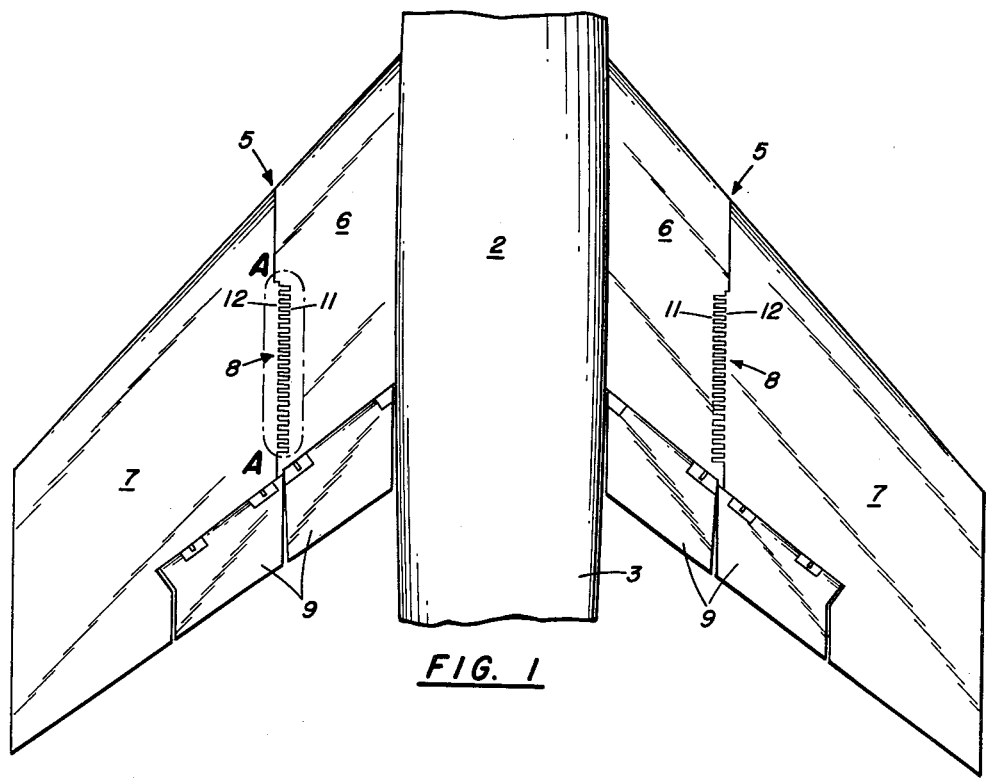
FIG. 1 shows a plan view of the body of an aircraft showing its wings and illustrating a preferred embodiment of the invention.

Referring now to the drawings, wherein like reference characters designate like or corresponding parts throughout the several views, there is shown in FIG. 1 a missile 3 having a body portion 2. Attached to the body portion 2 are a pair of wings 5, each of the wings 5 having an inner or fixed wing panel 6 and an outer folding wing panel 7 which are fastened together by a piano-type hinge joint 8. Also shown are the elevons 9, which are located on the rearward portion of the wings 5.

Figure 2:
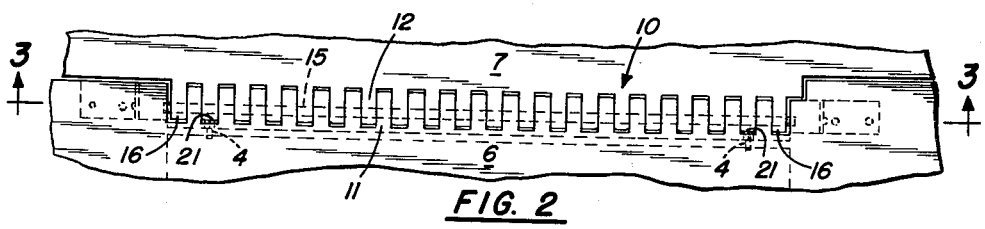
FIG. 2 shows an enlarged view of that area enclosed by enclosure A—A of FIG. 1.

FIG. 2 shows the upper hinge point 10 of FIG. 1 with a portion of the inner and outer wing panels 6 and 7 with their interlacing knuckles 11 and 12, respectively. At opposite ends of the upper hinge joint 10 are a pair of hydraulic cylinders 13 and 14, shown in dotted lines, the purpose of these cylinders to be explained later. Also shown in dotted lines is the upper pintle 15 about which the outer wing panel 7 rotates when it is rotated into its folded position. Also shown in dotted lines are a pair of adjustable stop bolts 4. Each of the stop bolts 4 is located in such a position that when the wing is lowered into its extended position, the stop bolt 4 which is mounted in the outer wing panel 7 will abut the outward face 21 of the second inner wing knuckle located inward from each end of the hinge joint.

Figure 3:
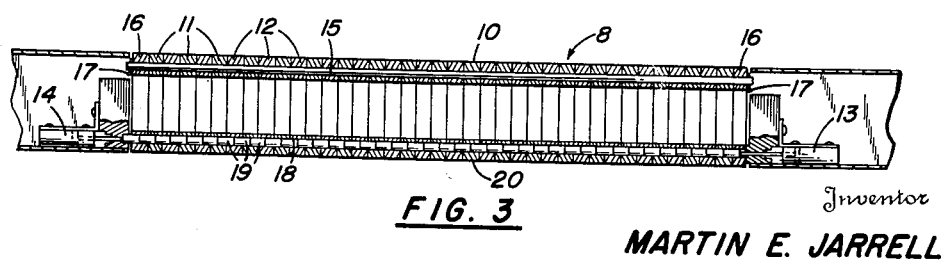
FIG. 3 is a section of the device taken on the line 3—3 of FIG. 2, looking in the direction of the arrows.

FIG. 3 is a view taken on line 3—3 of FIG. 2 illustrating the upper hinge joint 10 and the lower joint 20 and the manner in which the locking mechanism operates. As pointed out above, the pintle 15 serves as the pivot point for the upper hinge joint and it is about this point which the outer wing panel 7 rotates when it is rotated into its folded or extended position. The pintle 15 is fixedly secured at the two end knuckles 16 of inner wing panel 6 by means of a pair of cotter pins 17. It is to be noted that the pintle 15 passes through each of the inner and outer wing knuckles 11 and 12, respectively. The locking cylinder 13 and unlocking cylinder 14 are fixedly secured to the inner wing panel 6. The lower joint 20 of the hinge joint is provided with a plurality of bores 18. These bores 18 are in both the inner and outer wing knuckles, 11 and 12, respectively. Within these bores 18 are a plurality of locking pins 19 that are capable of being shifted axially by either the locking cylinder 13 or the unlocking cylinder 14 depending on which cylinder is actuated. It is to be noted that the length of each of the locking pins 19 is equal to the width of each of the inner and outer wing knuckles, 11 and 12, respectively, the reason for this is explained below.

When the locking pins are in the position shown in FIG. 3, they are in their locked position, and if it is desired to fold the wing, the unlocking cylinder 14 would be actuated. Upon actuation of the unlocking cylinder 14, the locking pins 19 are pushed to the right until the pins 19 each line up with either an inner wing knuckle 11 or an outer wing knuckle 12. When the locking pins 19 come into alignment with the knuckles 11 and 12, then the outer wing panel 7 is free to be rotated into its folded position. The diameter of the locking pins 19 may be made large enough to require the force of a hydraulic cylinder to move them axially within bores 18, thereby eliminating the need for retaining means to keep pins 19 within their respective bores 18. However, any suitable retaining means such as a spring loaded detent may be used to prevent the pins 19 from moving axially and falling out of their respective bores 18 when the wing panel 7 is placed in its folded position. When the outer wing panel 7 is rotated to its folded position means (not shown) may be provided for holding the wing panel in its folded position.

Assuming that it is now desired to return the wings to their extended position, the first step to be taken would be to actuate the hydraulic cylinder which will return the outer wing panel 7 to its extended position. The wing panel 7 rotates downwardly until the stop bolts 4 abut the outward face 21 of knuckle 11. The next step would be to actuate the locking cylinder 13. Upon actuation of the cylinder 13, the locking pins 19 will be shifted axially until the pins 19 are each in a position where one-half the length of each pin 19 is extending into a knuckle 11 of the inner wing panel 6 and the other half of the pin's length is extending into a knuckle 12 of the outer wing panel 7. When the pins 19 are in this position, the effect of the plurality of pins is the same as if a continuous rod similar to pintle 15 were used and the continuous spanwise bending moment is transferred over the entire length of the hinge joint.

Obviously many modifications and variations of the present invention are possible in the light of the above teachings. It is therefore to be understood that within the scope of the appended claims, the invention may be practiced otherwise than as specifically described.

What is claimed is:

1. In combination with an aircraft having a fuselage, a plurality of fixed wing panels extending from opposite sides of said fuselage, a plurality of folding wing panels cooperating with said fixed wing panels to provide a substantially continuous extension of said fixed and moveable wing sections, joint means operatively connecting said folding wing panels to said fixed wing panels, upper and lower joints forming said joint means, said upper joint having a plurality of knuckles extending alternately from said folding and fixed wing panels, a bore through each of said knuckles, said bores being in alignment with each other, pintle means disposed to interlock said knuckles, said pintle means effectively extending through each of said bores for permitting rotation of said folding wing panel thereabout, said lower joint having a plurality of knuckles extending alternately from said folding and fixed wing panels, a bore through each of said knuckles, said bores in said lower joint being in alignment with each other, a plurality of locking pins in said bores of said lower joint, each of said pins being of a length equal to the width of one of said knuckles and of a diameter sufficient to contact the wall of said bore over at least a plurality of points at spaced locations along said bore and to provide a sliding fit in said bore, actuating means for moving said pins into a locking and unlocking position, said pins when disposed in a locking relationship with said knuckle members forming a substantially solid load bearing connection across the chordwise length of said joint.

2. A folding wing type aircraft as described in claim 1 wherein said actuating means for moving said pins into locking and unlocking positions, comprises a pair of hydraulic cylinders, one each mounted at the respective outermost end of the outermost locking pins when said pins are disposed in said bores, said pins being in the locked position when a portion of the length of each of said pins is disposed in a fixed wing knuckle and an adjacent folding wing knuckle, said pins being in the unlocked position when the entire length of each of said pins is fully within a fixed wing panel knuckle or a folding wing panel knuckle respectively, each of said pins being axially moveable simultaneously into said locking and unlocking positions by means of said hydraulic cylinders.

3. In combination with an aircraft having a fuselage, a fixed wing panel extending from each side of said fuselage, a folding wing panel cooperating with each of said fixed wing panels, an upper and lower joint comprising joint means operatively connecting said folding wing panels to said fixed wing panels, linearly aligned interleaved knuckle members carried by each portion of said lower joint for mating engagement to provide a substantially continuous chordwise extension of the plane surfaces of said fixed and movable wing sections, said knuckle members when disposed in aligned mating engagement with complementary knuckle members of the mating wing section providing a substantially uniform longitudinal bore therethrough, a plurality of pins of a length corresponding to the axial bore width of said knuckle members and of a diameter sufficient to contact the wall of said bore over at least a plurality of points at spaced locations along said bore and to provide a sliding fit in said bore for providing a releasable pivotable lock for said wing sections when in one position thereof and a release mechanism for said pin members when axially displaced whereby the ends thereof are disposed in the plane of said knuckle members, and means for simultaneously displacing all of said pin members in unison for release or locking movement thereof, said pins when disposed in a locking relationship with said knuckle members forming a substantially solid load bearing connection across the chordwise length of said joint.

References Cited in the file of this patent

UNITED STATES PATENTS

| | | |
|---|---|---|
| 703,626 | Upson | July 1, 1902 |
| 1,887,676 | Brylka | Nov. 15, 1932 |
| 2,368,899 | Taylor | Feb. 6, 1945 |
| 2,403,568 | Watter | July 9, 1946 |
| 2,719,682 | Handel | Oct. 4, 1955 |
| 2,892,210 | Merkowitz | June 30, 1959 |

FOREIGN PATENTS

| | | |
|---|---|---|
| 635,259 | Great Britain | Apr. 5, 1950 |